(12) United States Patent
Asahina et al.

(10) Patent No.: US 7,090,945 B2
(45) Date of Patent: Aug. 15, 2006

(54) CELL, CONNECTED-CELL BODY, AND BATTERY MODULE USING THE SAME

(75) Inventors: Takashi Asahina, Toyohashi (JP); Shinsuke Fukuda, Moriguchi (JP); Shinji Hamada, Toyohashi (JP); Toyohiko Eto, Itsutsugaoka Toyota (JP); Masato Onishi, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 565 days.

(21) Appl. No.: 10/213,822

(22) Filed: Aug. 6, 2002

(65) Prior Publication Data
US 2003/0027040 A1 Feb. 6, 2003

(30) Foreign Application Priority Data
Aug. 6, 2001 (JP) ............................. 2001-237753
Jan. 18, 2002 (JP) ............................. 2002-009510
Jan. 23, 2002 (JP) ............................. 2002-014702

(51) Int. Cl.
H01M 2/30 (2006.01)
H01M 2/02 (2006.01)
H01M 2/06 (2006.01)
H01M 2/08 (2006.01)
H01M 2/20 (2006.01)

(52) U.S. Cl. .................... 429/179; 429/157; 429/159; 429/163; 429/176; 429/181; 429/185

(58) Field of Classification Search ................ 429/160, 429/163, 176, 178, 179, 181, 185, 156–159
See application file for complete search history.

(56) References Cited

U.S. PATENT DOCUMENTS

| | | | |
|---|---|---|---|
| 4,150,201 A | 4/1979 | Silveyra | |
| 4,882,242 A | 11/1989 | Kilb et al. | |
| 6,304,057 B1 | 10/2001 | Hamada et al. | |
| 6,455,190 B1 | 9/2002 | Inoue et al. | |
| 6,475,667 B1 | 11/2002 | Onishi et al. | |
| 6,821,673 B1 | 11/2004 | Hamada et al. | |
| 6,833,010 B1 | 12/2004 | Asahina et al. | |

(Continued)

FOREIGN PATENT DOCUMENTS

JP 2001-093503 4/2001

(Continued)

*Primary Examiner*—Jonathan Crepeau
(74) *Attorney, Agent, or Firm*—Jordan and Hamburg LLP

(57) ABSTRACT

A cell includes an electrode plate group which is formed by laminating a positive electrode plate and a negative electrode plate with a separator interposed between them, and includes leads protruding toward directions opposite to each other from one side of the positive electrode plate and the negative electrode plate, collectors which are joined to the leads on both sides of the electrode plate group, and include connection protrusions formed so as to protrude outside, and a bag-shape battery case containing the electrode plate group joined to the collectors such that only the connection protrusions of the collectors are protruded outside. A battery module is constituted by placing a plurality of the cells in a prismatic battery case while the connection protrusions of the collectors of the cells are connected with each other, thereby making the current-carrying path between the electrode plate groups straight and short and increasing the output.

20 Claims, 13 Drawing Sheets

U.S. PATENT DOCUMENTS

| | | |
|---|---|---|
| 6,838,209 B1 * | 1/2005 | Langan et al. ............... 429/178 |
| 6,890,683 B1 | 5/2005 | Asahina et al. |
| 6,924,060 B1 | 8/2005 | Hamada et al. |
| 6,939,642 B1 | 9/2005 | Asahina et al. |
| 7,022,432 B1 | 4/2006 | Asahina et al. |
| 2001/0007728 A1 | 7/2001 | Ogata et al. |
| 2003/0027040 A1 | 2/2003 | Asahina et al. |
| 2003/0077508 A1 | 4/2003 | Asahina et al. |
| 2003/0138692 A1 | 7/2003 | Asahina et al. |
| 2004/0142238 A1 | 7/2004 | Asahina et al. |

FOREIGN PATENT DOCUMENTS

| | | |
|---|---|---|
| JP | 2002-231214 | 8/2002 |

* cited by examiner

CELL, CONNECTED-CELL BODY, AND BATTERY MODULE USING THE SAME

The present disclosure relates to subject matter contained in priority Japanese Patent Application Nos. 2001-237753, 2002-9510, and 2002-14702 filed on Aug. 6, 2001, Jan. 18, 2002, and Jan. 23, 2002 respectively, the contents of which is herein expressly incorporated by reference in its entirety.

BACKGROUND OF THE INVENTION

1. Field of the Invention

The present invention relates to a cell, a connected-cell body, and a battery module using the same, and more particularly to a cell for reducing the internal resistance, a connected-cell body, and a battery module using the same.

2. Description of Related Art

A conventional battery module for providing a required electric power capacity by connecting a plurality of cells is constituted such that a plurality of individual prismatic cells are placed while longer side surfaces of their battery case are opposingly brought into contact with each other, end plates are provided outside of the battery cases of the cells on both the ends, and the cells are integrally connected by binding with a tie band. Also, leads are pulled out upward from the top ends of electrode plates in the individual cells, the leads are connected with terminals provided on a cover of the battery case, and then the terminals are connected with each other between the cells with connection plates.

As a result, since connection paths between the cells are long, and the number of connection points is large, resistance caused by constitution parts including connection parts becomes high. A ratio of this part resistance to a reaction resistance caused by a battery reaction among a positive electrode plate, a negative electrode plate, and electrolyte reaches 40:60 to 50:50. Since this large internal resistance increases heat generation, increasing the output and enhancing life characteristics are seriously obstructed. Also, since the connection constitution between the cells is complicated, and the number of the parts is large, the cost also increases.

In light of the foregoing, the present applicant previously proposed a battery module 101 including a plurality of cells 102 as shown in FIG. 16 and FIG. 17. The reference numeral 103 denotes a prismatic battery case which is formed as a flat rectangular solid. This battery case is constituted by integrally connecting a plurality of battery cases 104 in prismatic shape including a short side surface and a long side surface while the short side surface is mutually shared as a partition wall 105. Openings on the top surface of the individual battery cases 104 are closed by a single cover 106. Connection holes 107 are formed on an upper part of the outside short side surfaces of the battery cases 104 on both the ends, and on an upper part of the partition walls 105 between the individual battery cases 104.

The individual battery cases 104 store an electrode plate group 108 constituted by laminating a rectangular positive electrode plate and a rectangular negative electrode plate with a separator interposed between them in addition to electrolyte, thereby forming a cell 102. The positive electrode plate and the negative electrode plate of the electrode plate group 108 protrude from the sides opposite to each other to form leads 109a and 109b for the positive electrode plate and the negative electrode plate. Collector plates 110a and 110b are respectively connected with the side edges of the individual leads 109a and 109b by welding.

A connection protrusion 111 to be engaged into the connection hole 107 is formed at an upper part of the collector plates 110a and 110b. The connection protrusions 111 of the positive and negative collector plates 110a and 110b are connected by welding between the neighboring battery cases 104. Also, positive and negative connection terminals (terminal poles) 112 are installed into the connection holes 107 on the outer short side surface of the battery cases 104 on both the ends. Then, a connection protrusion 113 of the connection terminal 112 is connected with the connection protrusion 111 of the collector plate 110a or 110b by welding. Consequently, the plurality of cells 102 stored in the prismatic battery case 103 are connected serially, and a power is provided between the connection terminals 112 on both the ends.

In addition, communication passages 114 for equalizing the internal pressure of the individual battery cases 104, safety vents (not shown) for releasing the internal pressure in the individual battery cases 104 when the pressure increases more than a certain value, and a sensor installation hole 115 for installing a temperature sensor for detecting the temperature of a cell 102 are provided on the cover 106.

With the constitution shown in FIG. 16 and FIG. 17, the current-carrying paths from the positive electrode plate and the negative electrode plate to the leads 109a and 109b, and the collector plates 110a and 110b are short. On the contrary, since tips of the connection protrusions 111 on the top end of the collector plates 110a and 110b are connected with each other at the one point by welding as arrows in FIG. 18 show, the connection path is detoured, thereby increasing the length of the connection path. Further, since the connection point is one, the internal resistance increases. Also, as described above, since the connection path is detoured, large amount of current flows through the electrode plate group 108 close to the connection part of the collector plates 110a and 110b while small amount of current flows through the electrode plate group 108 far from the connection part as white arrows with black boarder show. Consequently, the distribution of the current flowing through the electrode plate group 108 becomes uneven, thus the entire electrode plate group 108 does not present uniform power generation capability, and consequently the loss increases.

SUMMARY OF THE INVENTION

An object of the present invention is to decrease the internal resistance per cell, thereby increasing the output, and to enable the entire electrode plate group to provide the intrinsic capability, thereby increasing the output in a battery module storing a plurality of cells. Another object is to provide a cell and a connected-cell body for realizing this battery module.

A battery module according to a first aspect of the present invention includes a plurality of cells and a prismatic battery case. The cell includes an electrode plate group which is formed by laminating a positive electrode plate and a negative electrode plate with a separator interposed between them, and includes leads protruding toward directions opposite to each other from one side of the positive electrode plate and the negative electrode plate, collectors which are joined to the leads on both sides of the electrode plate group, and include a connection protrusion formed so as to protrude outside, and a bag-shape battery case storing the electrode plate group joined to the collectors such that only the connection protrusions of the collectors are protruded outside. The prismatic battery case stores the multiple cells while the connection protrusions of the collectors are connected with each other.

With the constitution of the first aspect, the current-carrying paths to the individual leads and the collectors from the positive electrode plate and the negative electrode plate of the electrode plate group serving as a power generation element of the cell is shortened. Further, since the collectors are connected with each other at an arbitrary position by directly joining the connection protrusions when the cells are connected with each other, the current-carrying path is shortened. At the same time, the number of the connection points can be increased. Thus, the internal resistance is reduced, and consequently, the internal resistance per cell is reduced further accordingly, thereby increasing the output. In addition, since the distribution of the current flowing through the electrode plate group is equalized by providing a plurality of connection protrusions on the individual collectors, the entire electrode plate group provides the capability, thereby increasing the output further. In a battery module containing a plurality of cells in prismatic shape, since it is not necessary to provide a partition wall between the cells, the prismatic battery case is compact accordingly.

A battery module according to a second aspect includes a plurality of cells and a prismatic battery case. The cell includes an electrode plate group which is formed by laminating a positive electrode plate and a negative electrode plate with a separator interposed between them, and includes leads protruding toward directions opposite to each other from one side of the positive electrode plate and the negative electrode plate, collectors which are joined to the leads on both sides of the electrode plate group, and include a plurality of connection protrusions formed so as to protrude outside, and a bag-shape battery case containing the electrode plate group joined to the collectors such that only the connection protrusions of the collectors are protruded outside. The prismatic battery case includes a space for placing the plurality of cells while short side surfaces of the cells are connected with each other. The plurality of cells are placed in the prismatic battery case while the connection protrusions of the collectors are joined to each other.

With the constitution of the second aspect, in a compact flat prismatic sealed battery module containing the plurality of cells in prismatic shape whose short side surfaces are connected with each other, since the effects described above are provided, the output is increased. Also, since a partition wall between the cells can be eliminated, the length of the prismatic sealed battery module is reduced accordingly, and thus a compact constitution is provided.

A cell according to a third aspect includes an electrode plate group which is formed by laminating a positive electrode plate and a negative electrode plate with a separator interposed between them, and includes leads protruding toward directions opposite to each other from one side of the positive electrode plate and the negative electrode plate, collectors which are joined to the leads on both sides of the electrode plate group, and include a connection protrusion formed so as to protrude outside, and a bag-shape battery case containing the electrode plate group joined to the collectors such that only the connection protrusion of the collectors are protruded outside.

A connected-cell body according to a fourth aspect includes a plurality of cells including an electrode plate group which is formed by laminating a positive electrode plate and a negative electrode plate with a separator interposed between them, and includes leads protruding toward directions opposite to each other from one side of the positive electrode plate and the negative electrode plate, collectors which are joined to the leads on both sides of the electrode plate group, and include a connection protrusion formed so as to protrude outside, and a bag-shape battery case containing the electrode plate group joined to the collectors such that only the connection protrusions of the collectors are protruded outside. The neighboring cells are placed while their connection protrusions abut against each other, and then, the connection protrusions are welded to each other by electron beam or laser beam through a gap between cells.

A cell according to a fifth aspect includes an electrode plate group formed by laminating a positive electrode plate and a negative electrode plate with a separator interposed between them, collectors joined to leads with polarities opposite to each other provided on both sides of the electrode plate group, a bag-shape battery case containing the electrode plate group joined to the collectors, and including one or more connection openings corresponding to a middle part of the collectors, a seal material interposed between the periphery of the connection opening of the bag-shape battery case and the collector, and a connection member joined to the collector through the connection opening while compressing the seal material from the outer surface side of the bag-shape battery case.

With the constitution of the fifth aspect, since the collectors are joined to the leads on both sides of the electrode plate group, the individual electrode plates and the collectors are joined straight, and the distance between them is short consequently. Since the connection members for outside connection are connected with the middle part of the collectors through the connection openings on the bag-shape battery case, there are no additional connection members or connection points, and simultaneously the current-carrying paths of the collectors are short. Thus, the internal resistance is low. Further, since the connection member is connected with the middle part of the collectors, the distribution of the current flowing through the electrode plate group is equalized especially when the plurality of connection members are connected. Thus, the entire electrode plate group provides uniform power generation capability, and the output increases consequently. In addition, since the connection opening formed on the bag-shape battery case for joining the connection member is surely sealed by the seal material compressed by the connection member joined through the connection opening, the seal of the bag-shape battery case is secured.

A connected-cell body according to a sixth aspect includes the plurality of cells described above placed in parallel. The neighboring cells are connected with each other through the connection member for sequentially connecting the cells. As a result, a connected-cell body is provided which has a required electric power capacity, a low internal resistance as described above, and an electrode plate group uniformly exhibiting power generation capability as a whole.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

A first embodiment of a battery module of the present invention will be described referring to FIG. 1 to FIG. 12B.

Figure 1:
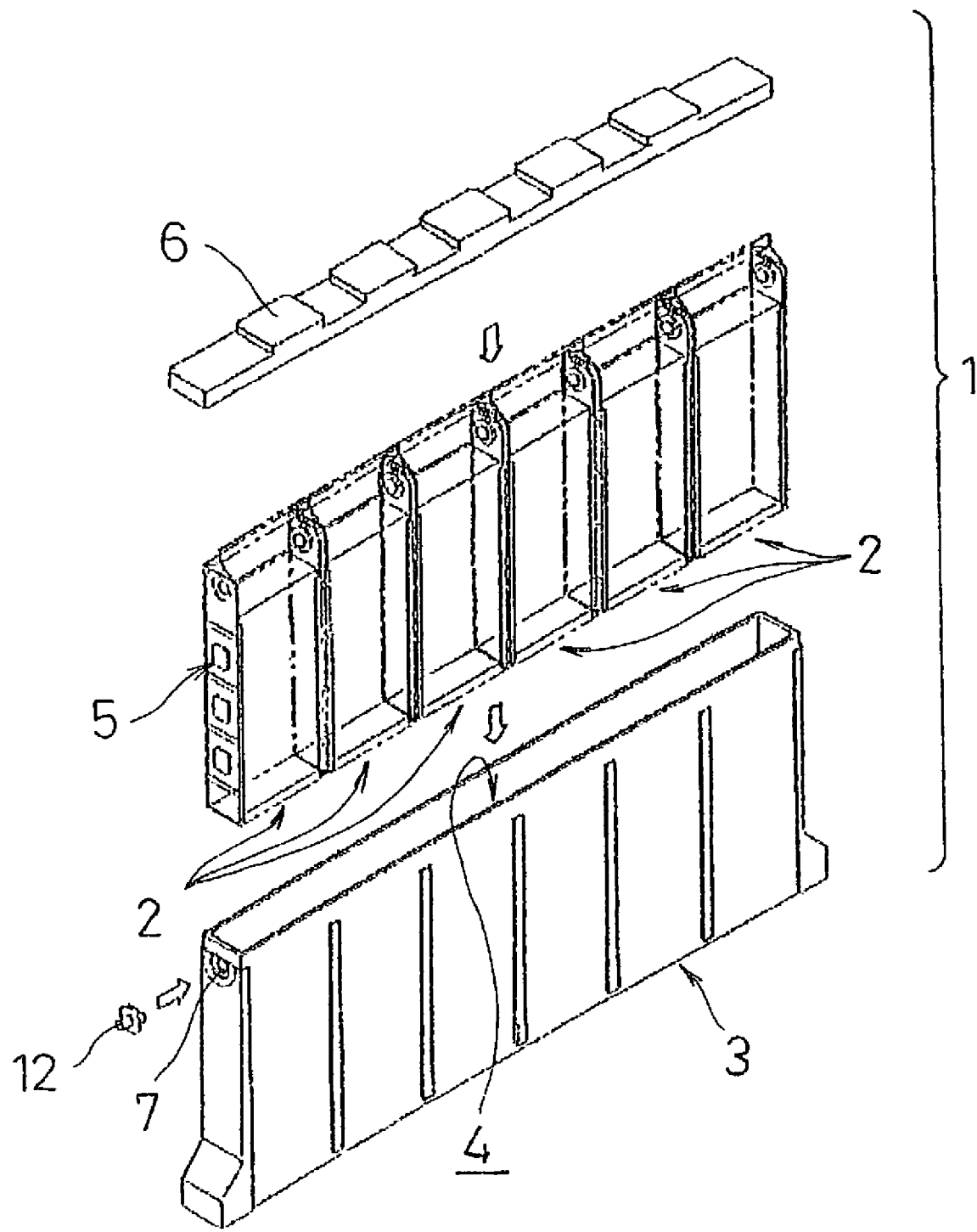
FIG. 1 is an exploded perspective view showing an assembly process of an embodiment of a battery module of the present invention.

In FIG. 1, a battery module 1 of the present embodiment includes a prismatic battery case 3. The prismatic battery case 3 has a horizontally oblong box shape, and forms a storage space 4 for storing a connected-cell body 5 including a plurality of (six in the drawing) cells 2. The connected-cell body 5 is formed by connecting the plurality of prismatic cells 2, including short side surfaces and long side surfaces, with each other at their short side surfaces. Connection holes 7 for installing and connecting a connection terminal 12 are formed on an upper part on both end walls of the prismatic battery case 3. In addition, a top opening of the prismatic battery case 3 is sealed by adhering a cover 6.

Figures 2A, 2B, 2C:
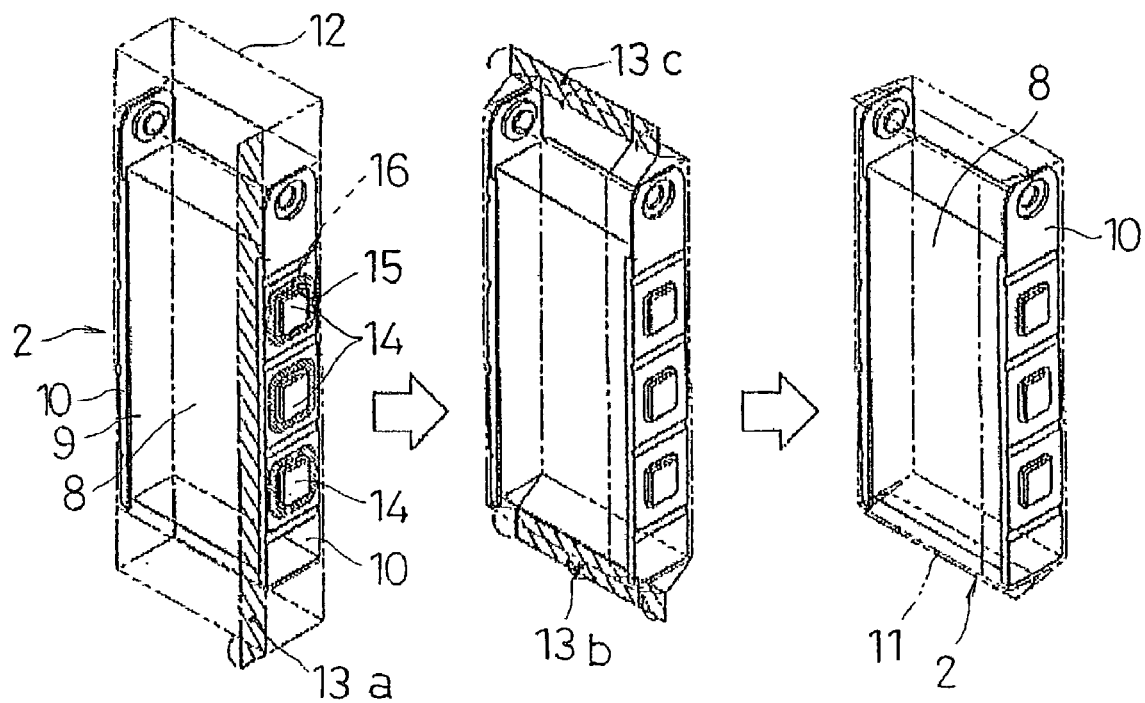
FIG. 2A to FIG. 2C are perspective views showing a process for forming a cell by storing an electrode plate group in a bag-shape battery case in the embodiment.

An electrode plate group 8 is constituted such that a plurality of positive electrode plates and negative electrode plates are alternately laminated with separators interposed between them. This is achieved by covering the individual positive electrode plates with the separator having a bag-shape and an opening in the widthwise direction, and stacking the positive electrode plates and negative electrode plates alternately. The cell 2 is provided with the electrode plate group 8, as shown in FIG. 2A to FIG. 2C. Positive and negative leads 9 are provided by protruding one side of the positive electrode plate and the negative electrode plate in directions opposite to each other on the electrode plate group 8. Collectors 10 are respectively joined to these leads 9. The cell 2 is constituted by storing the electrode plate group 8 joined to the collectors 10 (simply referred to as the electrode plate group 8 hereafter) along with electrolyte in a bag-shape battery case 11.

The positive electrode plate is constituted by filling Ni foamed metal excluding a part corresponding to the lead 9 with nickel hydroxide. The lead 9 of the positive electrode plate is constituted by compressing the foamed metal, and simultaneously ultrasonic-seam welding a lead plate on one surface. The negative electrode plate is constituted by applying a negative electrode material including hydrogen-absorption alloy to Ni punched metal excluding a part corresponding to the lead 9.

The bag-shape battery case 11 is constituted by joining a single-layer or multi-layer-laminated synthetic resin sheet 12 made of polypropylene or polyethylene into a bag shape by heat adhesion or adhesion with adhesive.

In a manufacturing process of the bag-shape battery case 11, first, as shown in FIG. 2A, after a rectangular synthetic resin sheet 12 with a thickness of 100 to 150 μm is wound on the electrode plate group 8 so as to surround it, both side edges are joined by heat seal 13a as shown by a hatch. Then, the bottom end of the tubular synthetic resin sheet 12 is joined by heat seal 13b as shown in FIG. 2B. Then, after a predetermined amount of electrolyte is filled in the bag-shape synthetic resin sheet 12, the top end of the sheet 12 is sealed by heat seal 13c as shown in FIG. 2C. Then, the joined top and bottom ends are bent. As a result, the electrode plate group 8 is stored along with the electrolyte in the bag-shape battery case 11, thereby constituting the cell 2.

Of course, the electrode plate group 8 may be stored along with electrolyte in the bag-shape battery case 11 formed in advance, and then the top opening may be sealed. The top end of the bag-shape battery case 11 is sealed while an opening is remained for preventing leakage of the electrolyte and releasing generated gas.

A plurality of connection protrusions 14 are formed in the lengthwise direction (in the up/down direction) at proper intervals on the collector 10. The protrusions 14 protrude outward, and have a rectangular or oblong circular shape seen in a front view. Through openings 15 are formed on the bag-shape battery case 11 such that the connection protrusions 14 pass through and protrude from them. A peripheral edge of the through opening 15 is sealed to the collector 10 with an adhesive or seal material 16. When the synthetic resin sheet 12 has proper heat adhesiveness, it may be heat-adhered.

Figure 3:
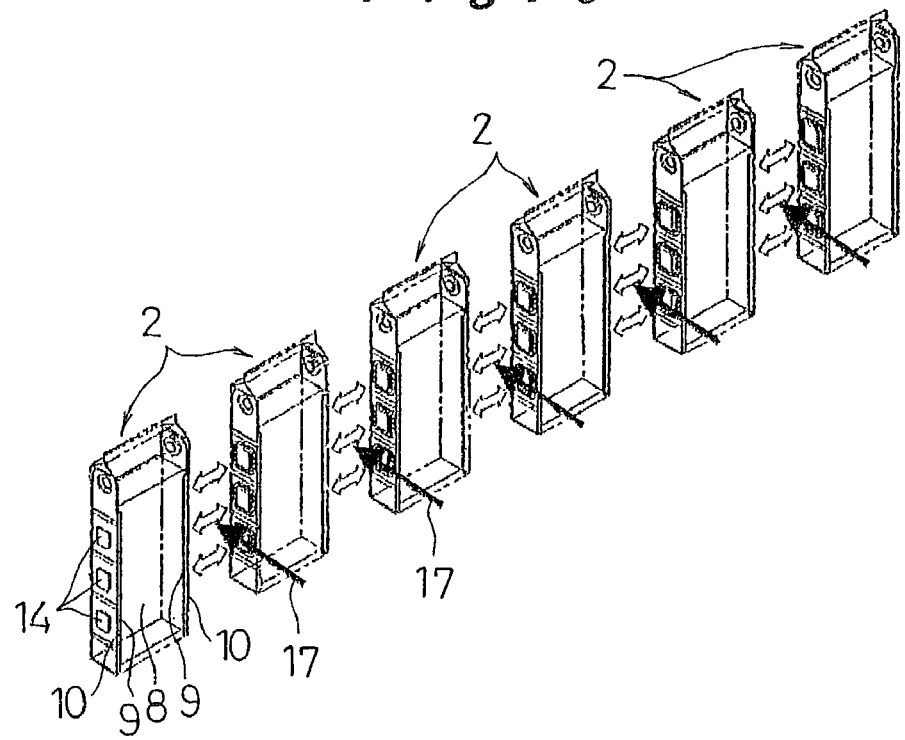
FIG. 3 is a perspective view showing a process for forming a connected-cell body by connecting the cells in the embodiment.

After the plurality of cells 2 constituted as described above are placed in parallel such that the short side surfaces, namely the collectors 10 on both sides, are opposing to each other as shown in FIG. 3. The cells 2 are arranged such that the connection protrusions 14 of the neighboring collectors 10 abut against each other, and then electron beam or laser beam 17 is irradiated on abutted end edges of the connection protrusions 14 through a gap between the cells 2 as arrows in FIG. 3 and FIG. 4 show, thereby joining the end edges to each other by welding 18.

Figure 4:
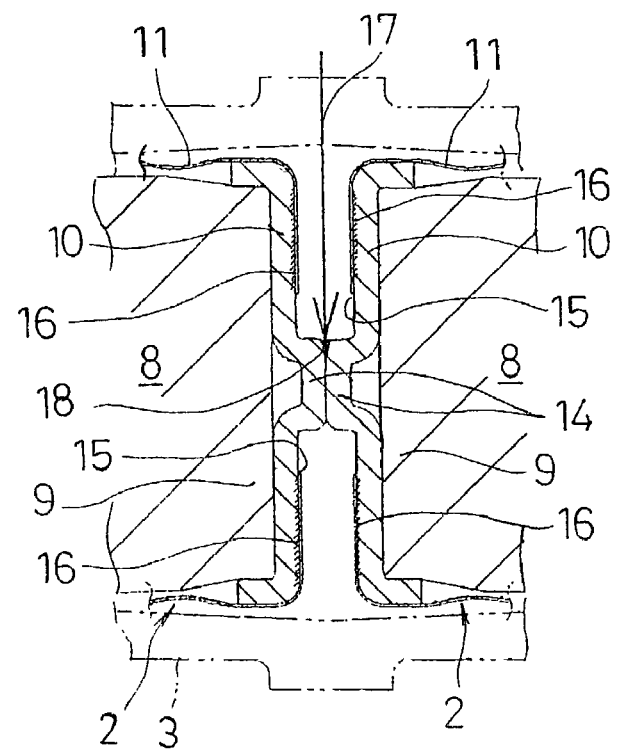
FIG. 4 is a transverse sectional view showing a process for joining connection protrusions of the cells to each other by welding in the embodiment.
Figure 5A:
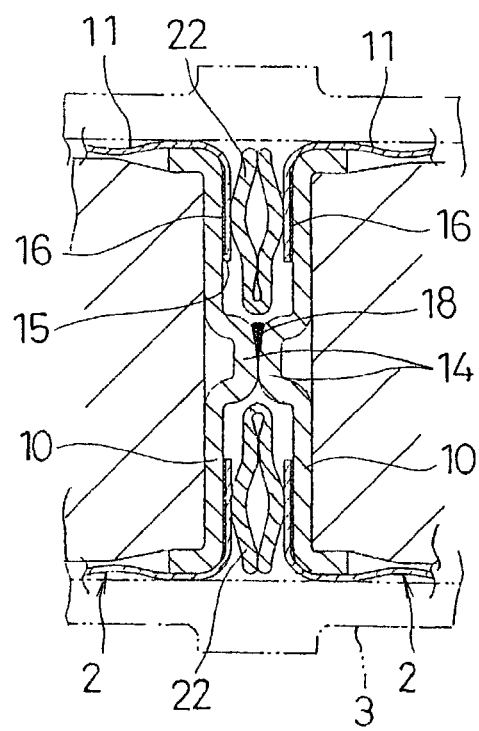
FIG. 5A and FIG. 5B are transverse sectional views of constitution examples where through openings for the connection protrusion on bag-shape battery cases are sealed with pressing members in the embodiment.
Figure 5B:
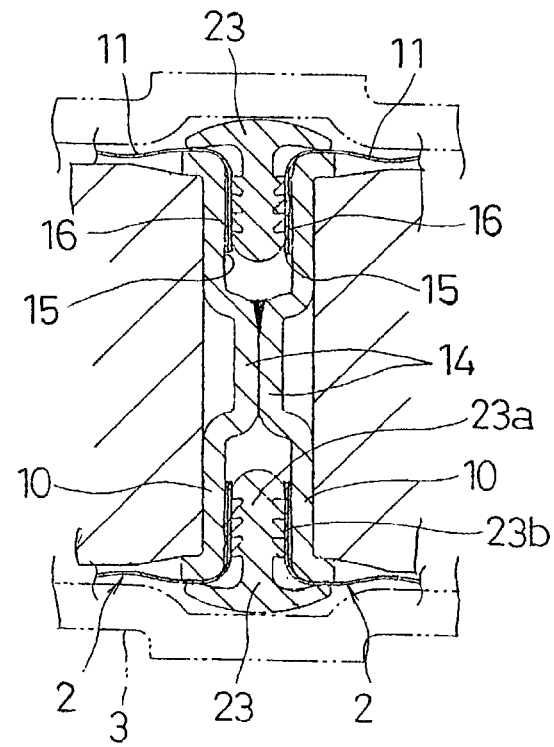

Though the peripheral edge of the through opening 15 on the bag-shape battery case 11 may be simply sealed to the collector 10 with the adhesive material or seal material 16 as shown in FIG. 4, it is preferable to interpose semicircular or U-shape pressing members 22 or 23 between the neighboring cells 2 for pressing the peripheral edges of the through openings 15 on the bag-shape battery cases 11 against the outer surface of the collectors 10 as shown in FIG. 5A and FIG. 5B, thereby pressing the seal for increasing the reliability. The semicircular or U-shape pressing member 22 shown in FIG. 5A is constituted by a member which has an approximately U-shape section, and simultaneously whose middle part between the outer and inner peripheries serving as the pressing part swells outward in arc shape. The pressing member 23 shown in FIG. 5B is constituted by protrudingly providing a plurality of pressing tongues 23b on both surfaces of a press insertion part 23a which is inserted in a gap between the cells 2. The pressing tongues 23b are elastically deformed for pressing during the press insertion.

Figure 6:
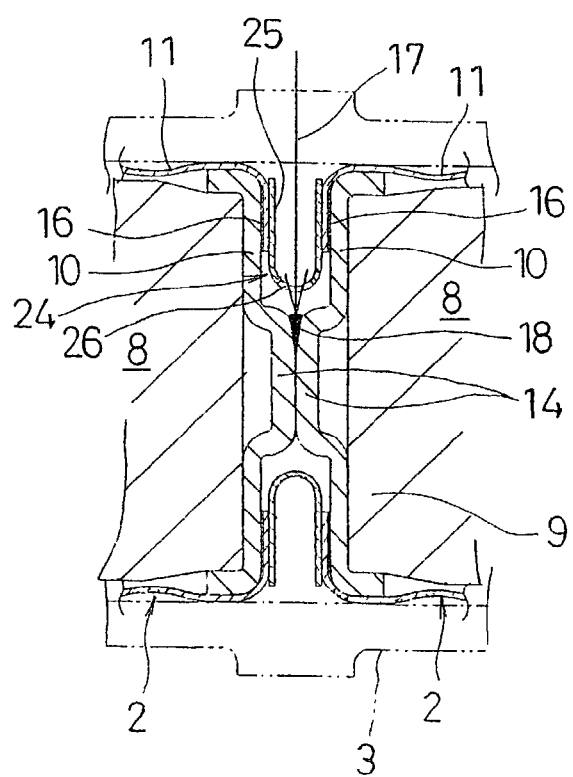
FIG. 6 is a transverse sectional view showing a process for joining the connection protrusions to each other by welding while the through openings for the connection protrusion on the bag-shape battery cases are sealed with a pressing member in the embodiment.
Figure 7A:
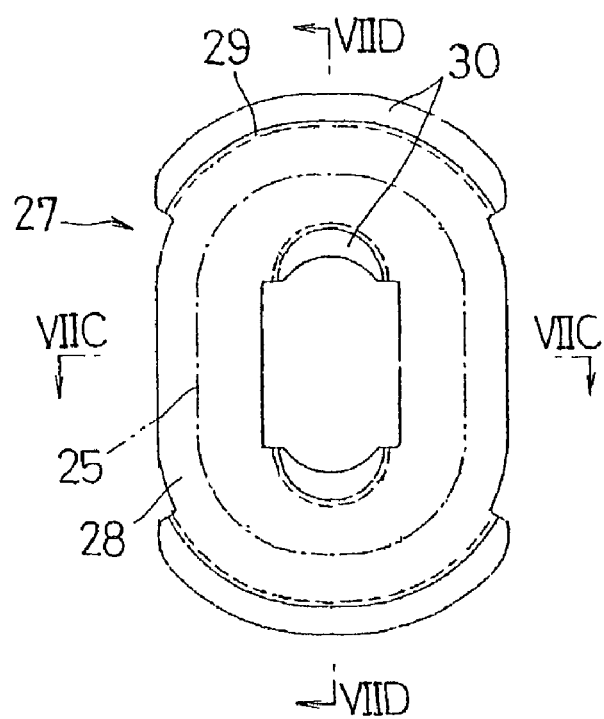
FIG. 7A is a front view of a specific example of a pressing member in the embodiment.
Figure 7B:
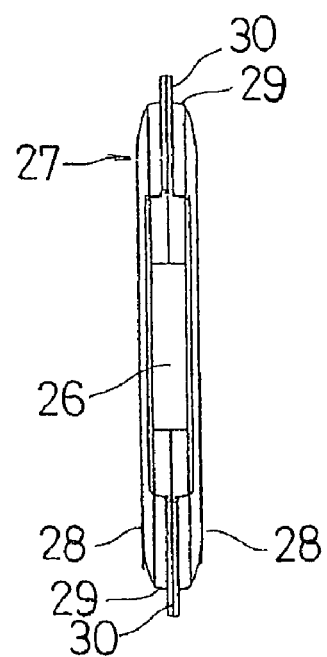
FIG. 7B is a side view of this pressing member.
Figure 7C:
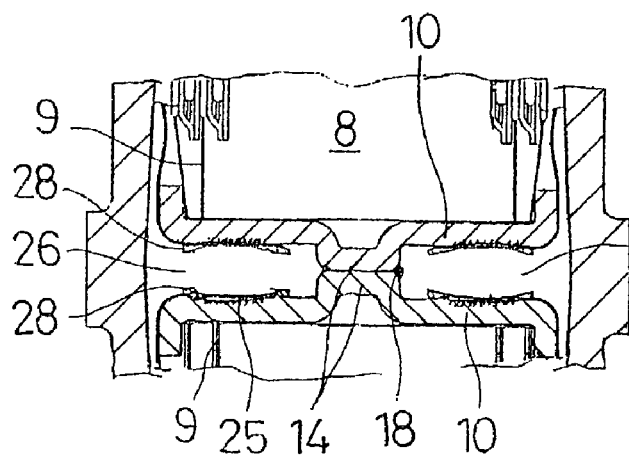
FIG. 7C is a sectional view taken along the line VIIC—VIIC in FIG. 7A in an installation state.
Figure 7D:
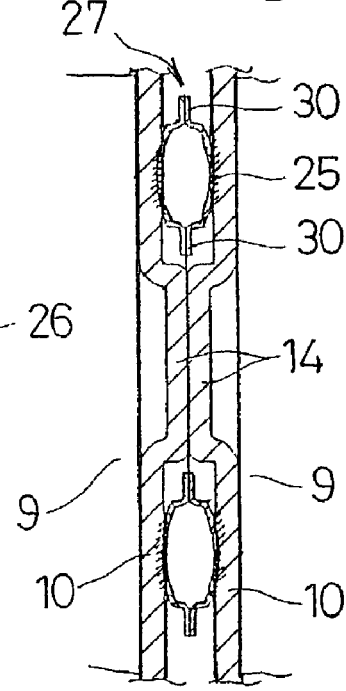
FIG. 7D is a sectional view taken along the line VIID—VIID in FIG. 7A.

In the examples in FIG. 5A and FIG. 5B, the two-piece pressing members 22 or 23 are inserted from both sides into the gap between the cells 2 to increase the reliability of the seal after the connection protrusions 14 of the cells 2 are joined to each other by the welding 18. However, when a pressing member 24 which includes an elastic annular part 25 having a U-shape section surrounding the periphery of the connection protrusions 14, and simultaneously having a through window 26 passing through toward the connection protrusions 14 from one side of the cells 2 is used as shown in FIG. 6, the connection protrusions 14 are joined by irradiating the electron beam or laser beam 17 through the through window 26 while the reliability of the seal is secured by pressing the entire periphery of the seal with the elastic annular part 25.

As a specific example of the pressing member, a pressing member 27 is preferable because it is manufactured with ease. As shown in FIG. 7A to FIG. 7D, the entire shape of an annular plate 28 for the pressing member 27 is an oblong circle whose section swells outward as arc. Joint flanges 30 are formed at inner and outer peripheries of semicircular parts on both the ends of the annular plate 28 while declining slopes 29 are interposed. The pressing member 27 is easily manufactured by integrally joining the joint flanges 30 while the two annular plates 28 are facing each other. In this pressing member 27, the oblong circle part whose section swells outward as arc constitutes the elastic annular part 25. Since the declining slope and the joint flange are not formed on both sides of parallel parts on both sides, the through window 26 is constituted consequently.

Since the pressing member 27 shown in FIG. 7A to FIG. 7D is constituted so as to surround the single connection protrusion 14, it is necessary to provide as many pressing members 27 as the number of the connection protrusions 14 provided on the collectors 10 between the neighboring cells 2. Thus, it is preferable to use a connection piece for integrally connecting as many pressing members 27 as the number of the connection protrusions 14 provided on the collectors 10, thereby increasing the workability during mounting.

Also, the description above shows an example for increasing the reliability of the seal by sealing the peripheral edge of the through opening 15 formed on the bag-shape battery case 11 to the collector 10 with the adhesive or seal material 16, and further by pressing the pressing member 22, 23, 24, or 27 against the seal. However, since the collectors 10 receive the reaction force of the pressing force generated by the pressing member 22, 23, 24, or 27, and the reaction force acts to detach the connection protrusions 14 joined by the welding 18, this constitution may not be preferable in some cases.

Figure 8:
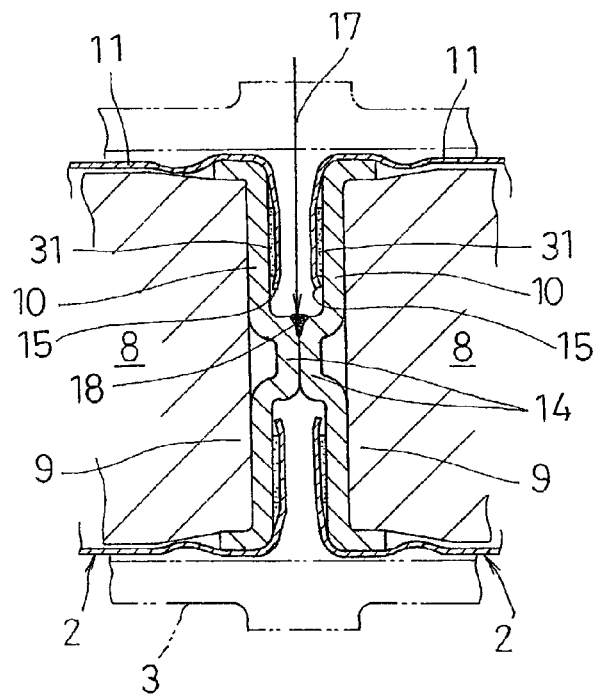
FIG. 8 is a transverse sectional view of another example for sealing the through openings for the connection protrusions on the bag-shape battery cases in the embodiment.

In view of the foregoing, as shown in FIG. 8, a synthetic resin film 31 made of polypropylene resin, polyethylene resin, or epoxy resin may be formed by baking around the connection protrusion 14 on the collector 10, and then the peripheral edge of the through opening 15 on the bag-shape battery case 11 may be heat-adhered to the resin film 31, thereby sealing the through opening 15 on the bag-shape battery case 11 to the collector 10. The resin film 31 is formed by attaching powder resin around the connection protrusion 14 on the collector 10, and then introducing it into a heating furnace at about 160 to 220° C., which depends on the type of the resin. In this process, it is preferable to use the resin film made of the same material as that used for the bag-shape battery case 11.

When the bag-shape battery case 11 is heat-adhered to the resin film 31 formed on the collector 10 by baking in this way, since it is possible to maintain high reliability of sealing the electrolyte, and the seal capability is secured without pressure by a pressing member, the number of the parts and the cost are reduced.

Figure 9:
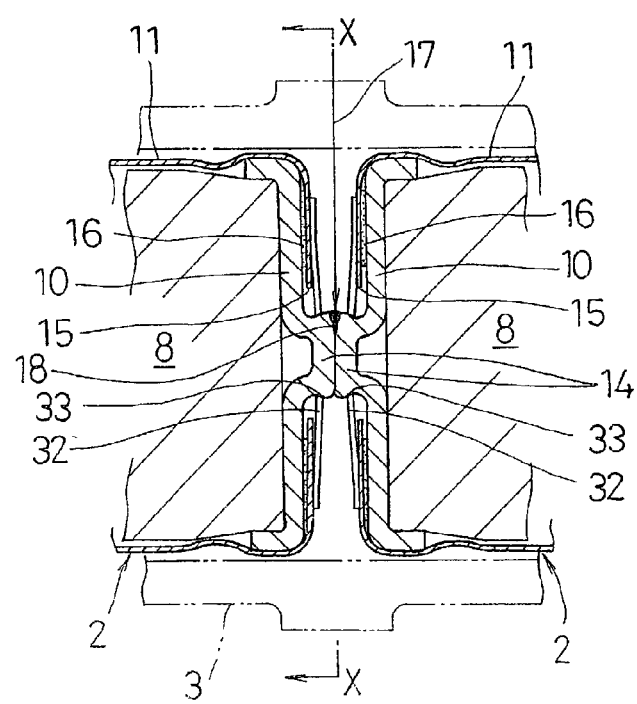
FIG. 9 is a transverse sectional view of another example for sealing the through openings for the connection protrusion on the bag-shape battery cases with pressing members in the embodiment.
Figure 10:
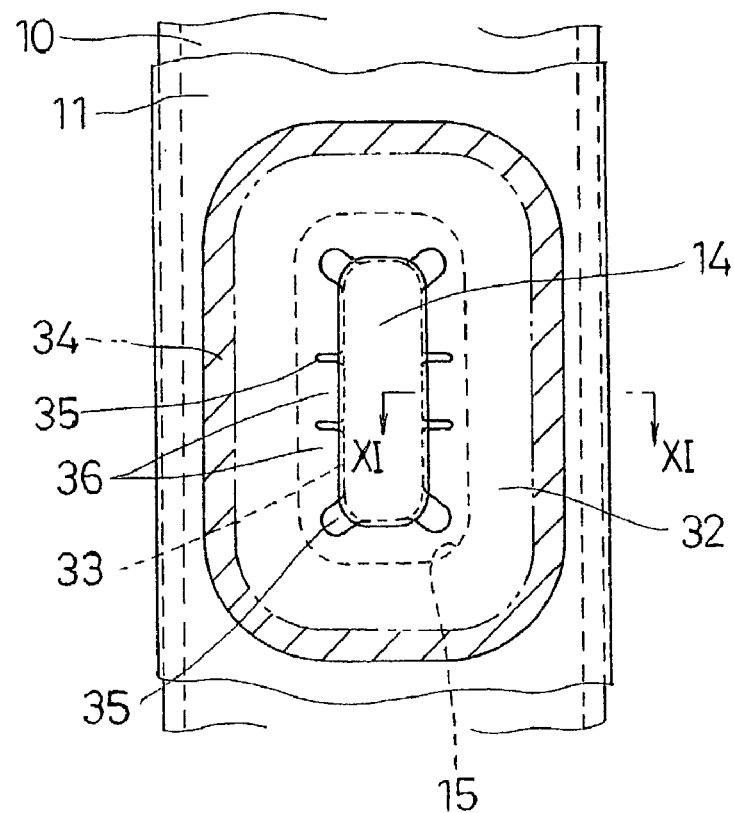
FIG. 10 is a view taken along the line X—X in FIG. 9.
Figure 11:
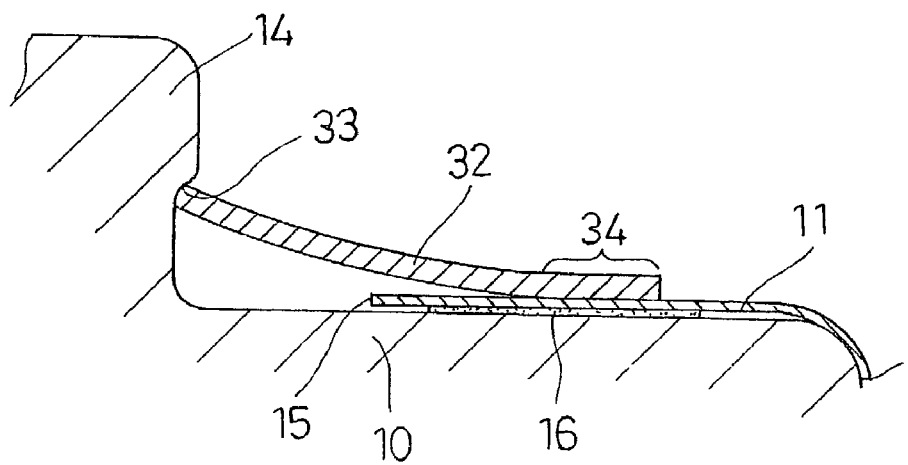
FIG. 11 is an enlarged sectional view taken along the line XI—XI in FIG. 10.

Also, it is possible to provide a constitution where the reaction force caused by the pressing member provided between the collectors 10 does not act to separate the collectors 10 even when an annular plate spring 32 is used as the pressing member, and an inner peripheral edge of the annular plate spring 32 is engaged with an engaging step 33 formed at an outer periphery of the tip of the connection protrusion 14 on the collector 10 as shown in FIG. 9 to FIG. 11. The annular plate spring 32 has an annular shape surrounding the periphery of the connection protrusion 14. The spring 32 is formed such that: on the outer periphery, a pressing plane 34 (shown as a hatch in FIG. 10) is formed for pressing the peripheral edge of the through opening 15 on the bag-shape battery case 11, the inner periphery thereof is sloped or curved so as to protrude toward one side, and to set the protruded height of the inner peripheral edge to be higher than the height dimension from the outer surface of the collector 10 to the engaging step 33 of the connection protrusion 14; and on the inner periphery an elastic plate 36 engaged with the engaging step 33 by an elastic deformation after passing over the end of the connection protrusion 14 is formed while the elastic plate 36 is divided by notches 35 provided at proper intervals in the circumferential direction.

When the annular plate spring 32 is used as the pressing member in this way, the adhesive material 16 or seal such as seal rubber or pitch is provided on the periphery of the connection protrusion 14 on the collector 10, the peripheral edge of the through opening 15 through which the connection protrusion 14 passes to protrude when the bag-shape battery case 11 covers the electrode plate group 8 is brought in contact with the outside of the seal or adhesive material 16, and the inner periphery of the annular plate spring 32 is pressed to pass over the connection protrusion 14. As a result, the cell 2 is constituted such that the periphery of the connection protrusion 14 is sealed with high reliability. Then, the connected-cell body 5 is constituted by connecting the connection protrusions 14 of the cells 2 with each other using welding 18. After that, the battery module 1 is constituted by storing the connected-cell body 5 in the prismatic battery case 3.

Figure 12A:
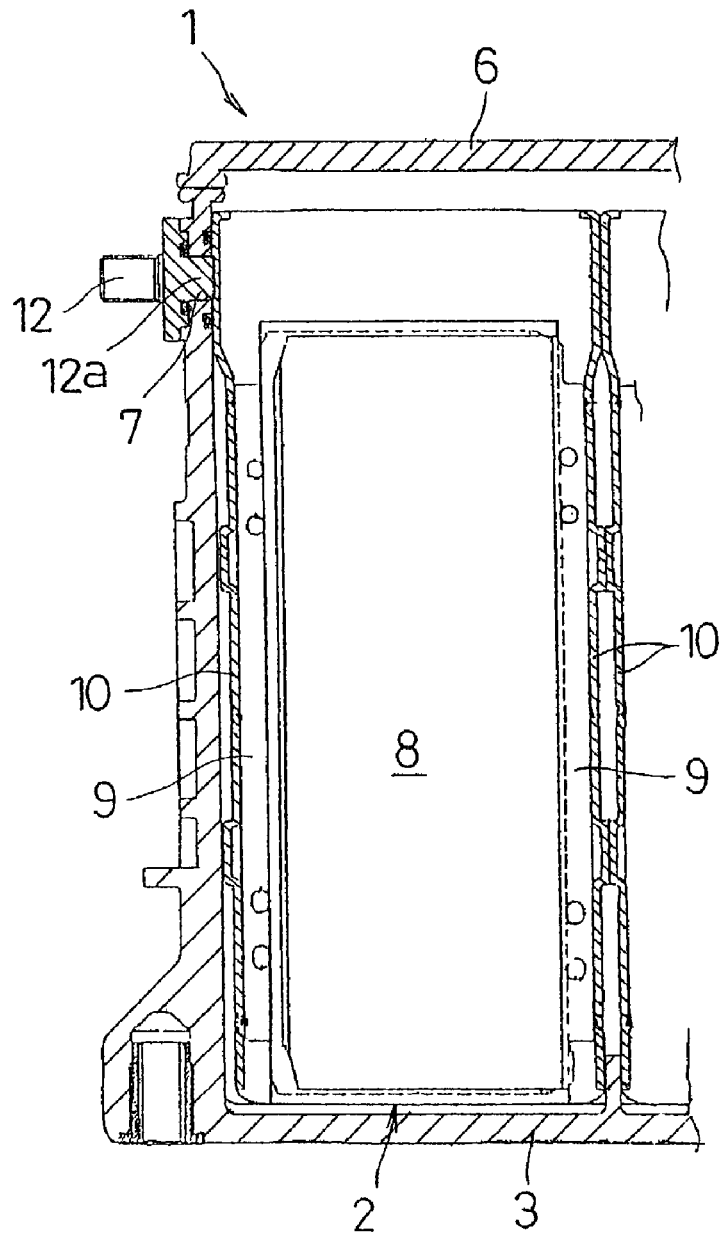
FIG. 12A is a longitudinal sectional view showing a structure of a connection part of a connection terminal on both ends of a prismatic battery case in the embodiment.
Figure 12B:
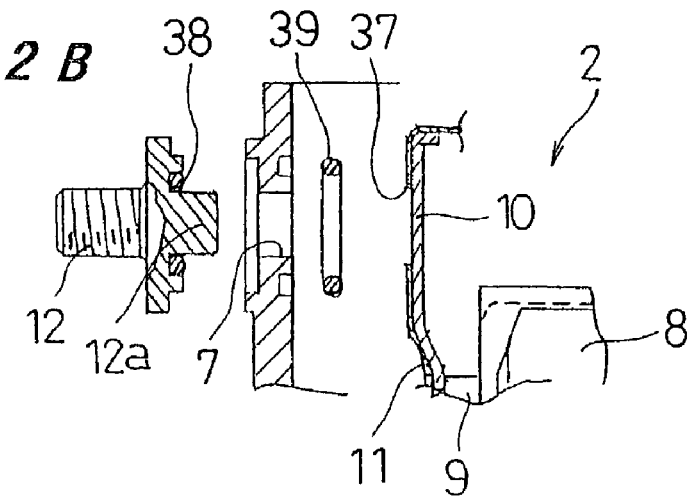
FIG. 12B is an exploded detail view of a principal part of the connection part.

On both the ends of the battery module 1 as shown in FIG. 12A and FIG. 12B, a connection protrusion 12a of the connection terminal 12 is engaged into the connection hole 7 formed on an upper part of both end walls of the prismatic battery case 3, and then the tip of the connection protrusion 12a is joined to an upper end of the outer collectors 10 in the cells 2 on both the ends by resistance welding. For this process, an opening 37 is formed on a part opposing to the connection protrusion 12a on the bag-shape battery case 11 covering the outer surface of the cell 2. Also, an O-ring 38 is installed on the outer periphery of a base of the connection protrusion 12a, thereby sealing between the base and the outer surface of both the end walls of the prismatic battery case 3. Simultaneously, an O-ring 39 is installed on the periphery of the connection hole 7 on the inner surface of both the end walls of the prismatic battery case 3, thereby sealing between the connection protrusion 12a and the periphery of the opening 37 on the bag-shape battery case 11. As a result, the through part for the connection terminal 12 has a double seal structure.

With the battery module 1 constituted as described above, the current-carrying paths to the individual leads 9 and the collectors 10 from the positive electrode plate and the negative electrode plate of the electrode plate group 8 serving as a power generation element of the cell 2 are short. In addition, since the collectors 10 are connected with each other by directly joining the plurality of connection protrusions 14 for connecting the cells 2 with each other, the current-carrying paths are straight and short in the battery module 1. At the same time, a plurality of current-carrying paths are provided between the cells 2. As a result, the internal resistance is remarkably reduced, and thus the internal resistance per cell 2 is reduced further accordingly, resulting in a high output.

Since it is not necessary to provide a partition wall between cells 2 in the compact flat battery module 1 storing a plurality of prismatic cells 2 while their short side surfaces are connected with each other, the length of the prismatic battery case 3 is reduced accordingly, and thus, the battery case 3 is constituted compactly.

Also, since the connection protrusions 14 are joined to each other by electron beam welding or laser beam welding through the gap between cells 2 while the neighboring cells 2 are placed such that the connection protrusions 14 abut against each other, the connection protrusions 14 are surely and efficiently joined to each other by welding without causing adverse effect on the electrode plate group 8 and the bag-shape battery case 11.

Also, since the peripheral edge of the through opening 15 formed on the bag-shape battery case 11 for passing through the connection protrusion 14, and the outer surface of the collector 10 are sealed together by the adhesive or seal material 16, the electrolyte inside the bag-shape battery case 11 is securely sealed with a simple constitution while the connection protrusion 14 is protruding from the through opening 15 on the bag-shape battery case 11. Though it is possible to seal the metal collector 10 and the bag-shape battery case 11 made of a resin film together by heat adhesion, sealing by the adhesive or seal material 16 securely seals the electrolyte with more reliability. Also, if the resin film 31 made of resin same as that used for, the bag-shape battery case 11 is formed by baking on the collector 10 in advance for the heat adhesion, the seal is secured with more reliability.

Further, since the pressing member 22, 23, 24, or 27 for pressing the peripheral edge of the through opening 15 formed on the bag-shape battery case 11 against the outer surface of the collector 10 is interposed between the neighboring cells 2, the pressure of the pressing member on the seal increases the reliability further.

Especially, in a case where the pressing member 24 or 27 including the elastic annular part 25 surrounding the periphery of the connection protrusion 14, and the through window 26 on the elastic annular part 25 passing through from the one side of the cell 2 toward the connection protrusions 14 are used, since the connection protrusions 14 are joined through the through window 26 while the entire periphery of the seal is pressed for securing the reliability. Thus, the workability and the reliability of the seal are simultaneously satisfied. Also, it is preferable to use the annular plate spring 32 engaged to the connection protrusion 14 as the pressing member, because the reaction force of the pressing force does not act to separate the joint of the connection protrusions 14, and simultaneously the annular plate spring 32 does not obstruct joining the connection protrusions 14.

The embodiment described above shows the example of the prismatic battery case 3 made of synthetic resin. Since the individual cells 2 in the present invention include the bag-shape battery case 11 sealed while storing the electrolyte, it is possible to store and arrange the cells in a metal prismatic battery case. Further, when a metal prismatic battery case includes an insulation coating on the inner surface, it is possible to obtain high reliability for insulation, and simultaneously to secure high cooling capability, thereby efficiently restraining temperature increase of the individual cells 2.

The embodiment described above shows the example of the flat battery module 1 storing a plurality of prismatic cells 2 while their short side surfaces are connected with each other. It is possible to arrange the plurality of cells 2 as a matrix such that a plurality of flat storage spaces with cooling passages interposed between them are formed in parallel in a box-shape prismatic battery case, the cells connected as described above are arranged and stored in the individual flat storage spaces, and the ends of the storage spaces are connected by welding connection fittings provided on the prismatic battery case to the connection protrusions.

The following section will describe a cell and a connected-cell body of a second embodiment of the present invention which are preferably used for the battery module 1 described above while referring to FIG. 13 to FIG. 15.

Figure 13:
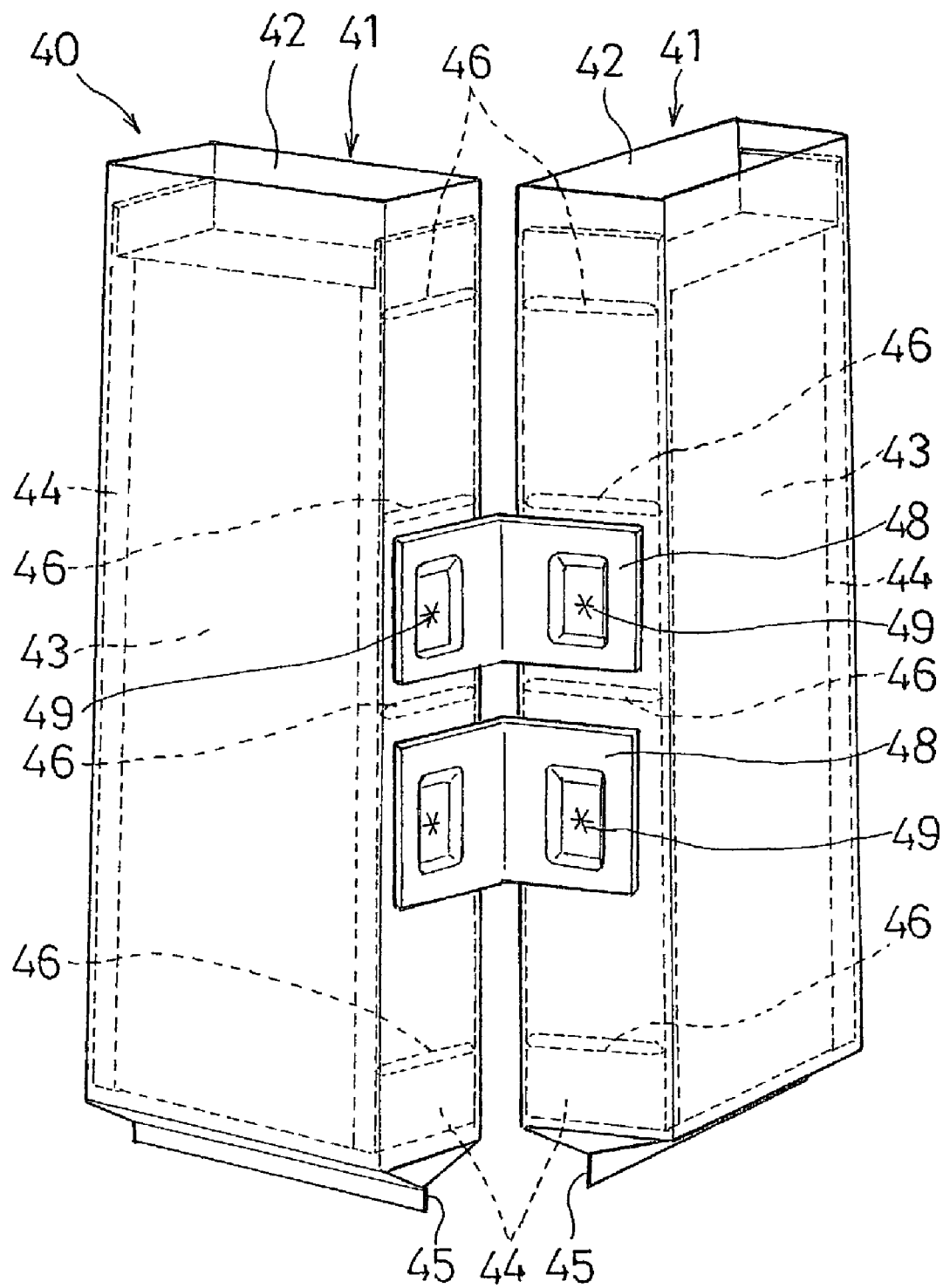
FIG. 13 is an external perspective view of a manufacturing process for a connected-cell body using cells according to another embodiment of the invention.
Figure 14:
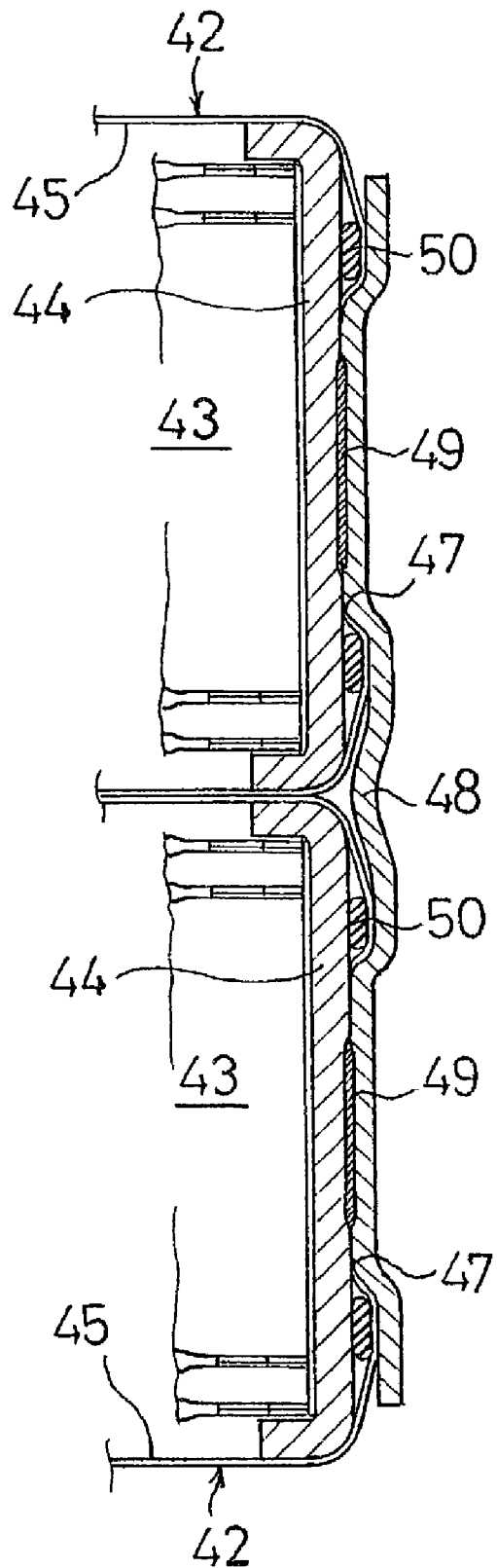
FIG. 14 is a transverse sectional plan view of a principal part of the embodiment.
Figure 15:
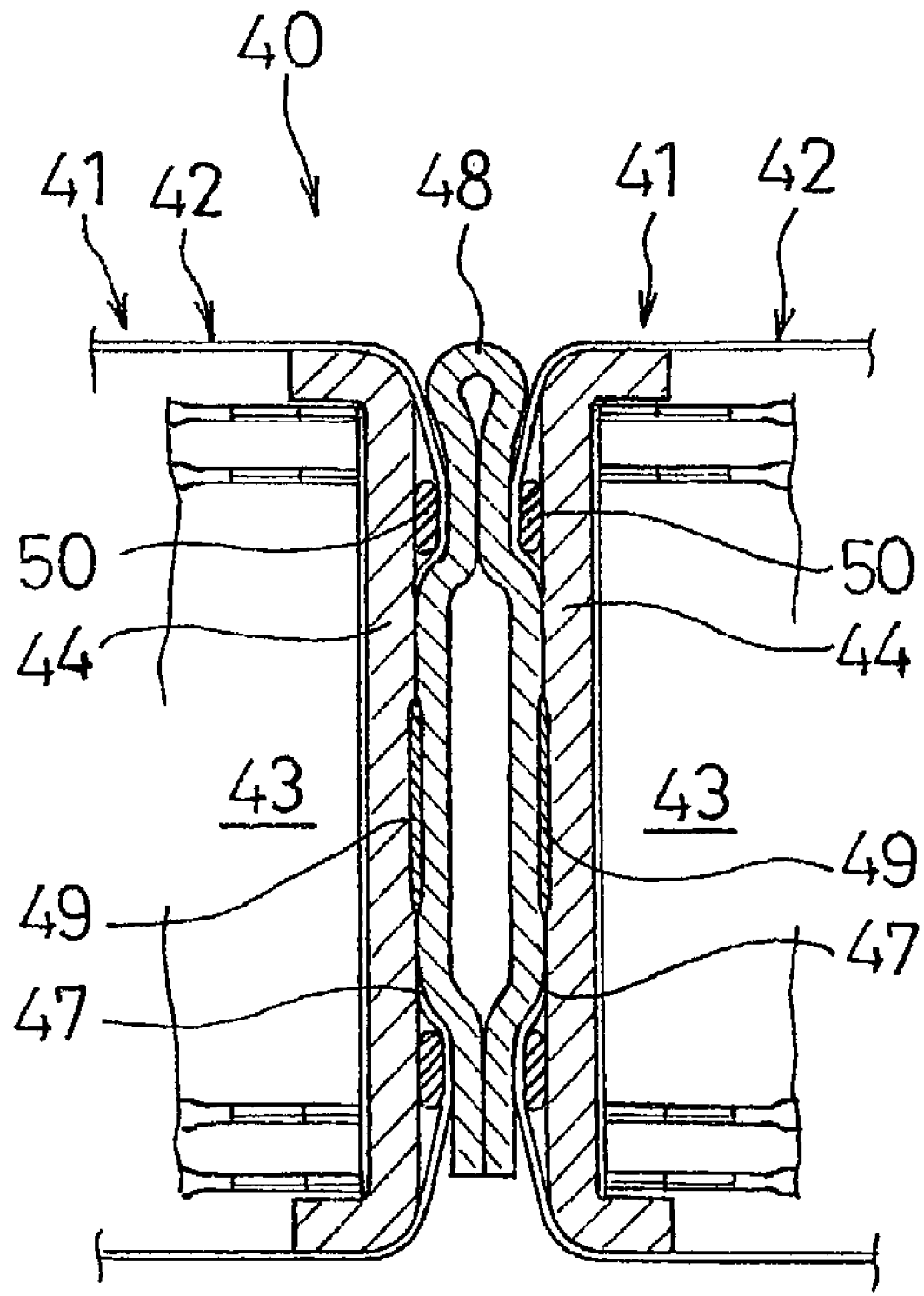
FIG. 15 is a transverse sectional plan view of a connected-cell body formed by serially connecting the cells in the embodiment.
Figure 16:
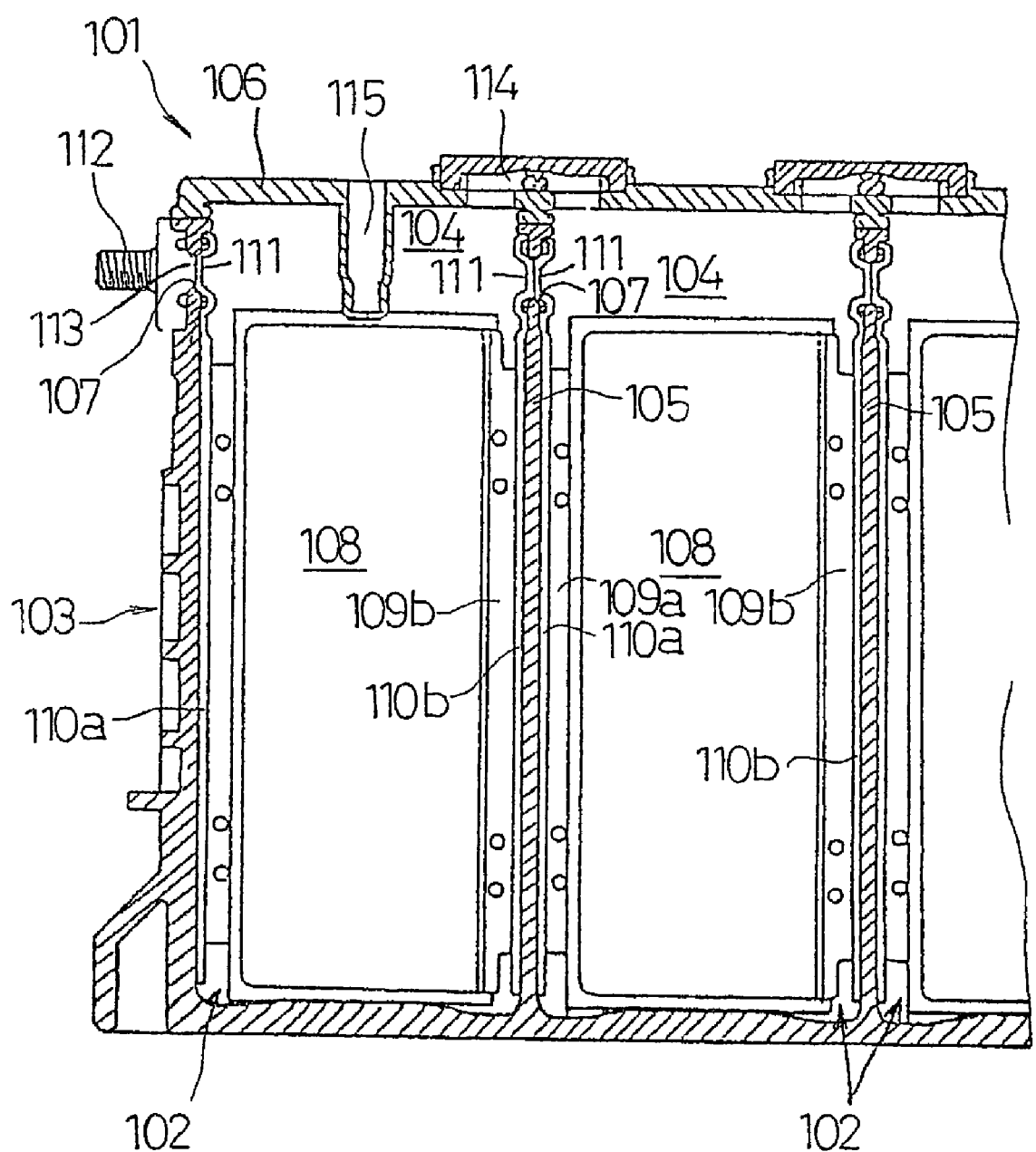
FIG. 16 is a partial longitudinal sectional view of a conventional battery module.
Figure 17:
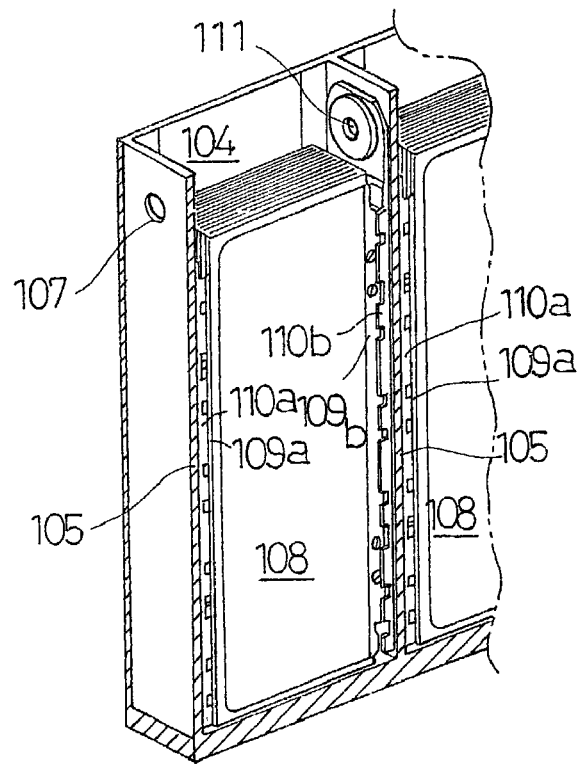
FIG. 17 is a partially cutaway perspective view showing a battery case of the conventional battery module.
Figure 18:
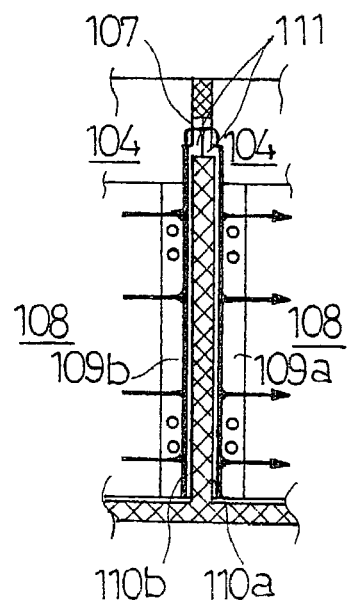
FIG. 18 is an explanatory drawing of current-carrying paths of the conventional battery module.

In FIG. 13 to FIG. 15, a connected-cell body 40 is constituted by connecting a plurality of (only two in the drawing) cells 41. The cell 41 is constituted by storing an electrode plate group 43 including collectors 44 joined on both ends along with electrolyte in a bag-shape battery case 42.

The bag-shape battery case 42 is constituted by joining a single-layer or multi-layer-laminated synthetic resin sheet 45 made of polypropylene or polyethylene into a bag shape by heat adhesion or adhesion with adhesive. Specifically, the synthetic resin sheet 45 with a thickness of 100 to 150 μm is wound on the electrode plate group 43 so as to surround it. Then, both side edges are joined by heat seal, and the bottom end of the tubular synthetic resin sheet 45 formed in this way is joined by heat seal (FIG. 13 shows this state).

Then after a predetermined amount of electrolyte is filled in the tubular bag-shape synthetic resin sheet 45, the top end of the sheet 45 is joined by heat seal. The top end of the bag-shape battery case 42 is sealed while an opening is remained for preventing leakage of the electrolyte and for releasing generated gas.

As the electrode plate group 8 of the first embodiment, the electrode plate group 43 is constituted by laminating a plurality of positive electrode plates and a plurality of negative electrode plates with separators interposed between them while the positive electrode plates and the negative electrode plates are arranged alternately, and simultaneously the individual positive electrode plates are covered with the bag-shape separator having an opening in the widthwise direction. A positive electrode lead and a negative electrode lead are provided by protruding one side of the positive electrode plate and the negative electrode plate in directions opposite to each other. Collectors 44 constituted by a steel plate with nickel plating on the surface are joined to the leads.

The collector 44 and the leads of the electrode plate group 43 are joined by electron beam welding at a plurality of (four in the example shown in the drawing) joints 46 set at proper intervals in the up/down direction on the collectors 44.

A plurality of (a pair in the example shown in the drawing) connection openings 47 are provided on the bag-shape battery case 42 so as to face the outer surface of the collector 44 at proper positions between the joints 46 as detailed in FIG. 14. Connection members 48 are joined to the outer surface of the collector 44 at welded parts 49 by resistance welding or laser beam welding through the connection opening 47. When the pair of upper and lower connection openings 47 are provided in this way, since current flows between the upper and lower connection members 48 and the collector 44, highly reliable joints are realized by resistance welding.

Also, since an O-ring 50 as an annular seal member is interposed between the periphery of the connection opening 47 on the bag-shape battery case 42 and the collector 44, and simultaneously the connection member 48 is joined to the collector 44 while the O-ring 50 is pressed from the outer surface side of the bag-shape battery case 42, a gap between the peripheral edge of the connection opening 47 on the bag-shape battery case 42 and the outer surface of the collector 44 is sealed by the O-ring 50.

Since the inside of the bag-shape battery case 42 is sealed from the outside while the connection member 48 is joined, the top end of the bag-shape synthetic resin sheet is joined by heat seal after the predetermined amount of the electrolyte is filled in the bag-shape battery case 42 as described above.

Then, a required number of the cells 41 are placed in parallel, and the neighboring cells 41 are connected with each other by the connection member 48. In this way, the connected-cell body 40 formed by sequentially connecting the required number of the cells 41 is constituted.

When the connection member 48 connecting the neighboring cells 41 is bent between the cells 41, the connected-cell body 40 where the required number of cells 41 are integrally and serially arranged is constituted as shown in FIG. 15.

With the constitution described above, since the collectors 44 are joined to the leads on both sides the electrode plate group 43 in the individual cells 41, the paths between the individual electrode plates and the collectors 44 are straight and short. Simultaneously, since the connection member 48 is connected with a middle part of the collector 44 through the connection opening 47 on the bag-shape battery case 42, there are no other connection members or connection points, and the current-carrying path on the collector 44 is short, resulting in a low internal resistance. Further, since the connection member 48 is connected with the middle part of the collector 44, especially when the multiple connection member 48 are connected, the distribution of the current flowing through the electrode plate group 43 is equalized, and thus the entire electrode plate group 43 provides uniform power generation capability, resulting in a high output.

Since the O-ring 50 serving as an annular seal member is pressed by the connection member 48 joined through the connection opening 47 formed on the bag-shape battery case 42, a seal with high reliability is surely obtained at the connection opening 47. As a result, high seal capability for the electrolyte is secured while the connection opening 47 for connecting the connection member 48 is provided on the bag-shape battery case 42.

Also, since the electrode plate group 43 and the collector 44 are joined at the plurality of joints 46 provided in the lengthwise direction of the collector 44 at proper intervals, and then the connection openings 47 for joining the connection members 48 are provided between the joints 46, the current-carrying path from the outside to the electrode plate group 43 routes through the connection member 48, the collector 44, and the joints 46 to the electrode plate group 43, and thus the distance of the current-carrying path is short. Simultaneously, since the current flows to the electrode plate group 43 through the plurality of joints, the current distribution in the electrode plate group 43 is further equalized, and thus the entire electrode plate group 43 provides power generation capability uniformly, resulting in a high output.

When the connection member 48 connecting between the neighboring cells 41 is bent between the cells 41 as shown in FIG. 15, and thus the required number of the cells 41 are arranged serially, the connected-cell body 40 where the plurality of cells 41 are integrally and serially arranged is easily constituted.

While the description of the present embodiment shows an example where the neighboring cells 41 are connected with the connection member 48, and then the plurality of cells 41 are serially arranged by bending the connection members 48 between the cells, the bend is not always necessary depending on the arrangement of the cells 41.

Further, while the present embodiment shows an example where the neighboring cells 41 are connected with the single connection member 48, independent connection member 48 may be provided for the individual cells 41, and then the connection members 48 may be connected with each other by welding such as laser beam welding and electron beam welding, they may be connected by adhesion with conductive adhesive, or they may be connected by another connection member. However, connecting with the single connection member 48 reduces the resistance further.

While the plurality of rectangular positive electrode plates and negative electrode plates laminated through the separators are exemplified as the electrode plate groups 8 and 43, the present invention is not limited to these electrode plate groups. For example, as the electrode plate group, belt-shape positive electrode plate and negative electrode plate provided with leads on sides opposite to each other are laminated through a separator, another separator is laminated at the top or bottom of them, and then they are wound in a shape with an oblong section or in approximately a rectangular shape.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery module comprising:
a plurality of cells including an electrode plate group formed by laminating a positive electrode plate and a negative electrode plate with a separator interposed between them, said electrode plate group including leads protruding toward directions opposite to each other from one side of the positive electrode plate and the negative electrode plate, collectors joined to the leads on both sides of the electrode plate group, said collectors including a connection protrusion formed so as to protrude outside, and a bag-shape battery case storing the electrode plate group joined to the collectors such that only the connection protrusions of the collectors are protruded outside; and
a prismatic battery case for accommodating the plurality of cells while the connection protrusions of the collectors are connected with each other.

2. A battery module comprising:
a plurality of cells including an electrode plate group formed by laminating a positive electrode plate and a negative electrode plate with a separator interposed between them, said electrode plate group including leads protruding toward directions opposite to each other from one side of the positive electrode plate and the negative electrode plate, collectors joined to the leads on both sides of the electrode plate group, said collectors including a connection protrusion formed so as to protrude outside, and a bag-shape battery case storing the electrode plate group joined to the collectors such that only the connection protrusions of the collectors are protruded outside; and
a prismatic battery case including a space for placing the plurality of cells while short side surfaces of the cells are connected with each other, wherein
the plurality of cells are placed in the prismatic battery case while the connection protrusions of the collectors are joined to each other.

3. The battery module according to claim 1, wherein the neighboring cells are placed while their connection protrusions abut against each other, and the connection protrusions are welded to each other by electron beam or laser beam through a gap between cells.

4. The battery module according to claim 1, wherein a peripheral edge of a through opening formed on the bag-shape battery case for passing through the connection protrusion, and an outer surface of the collector are sealed together by an adhesive material or a seal material.

5. The battery module according to claim 4, wherein a pressing member is interposed between the neighboring cells for pressing the peripheral edge of the through opening against the outer surface of the collector.

6. The battery module according to claim 5, wherein the pressing member includes an elastic annular part surrounding the periphery of the connection protrusion, and the elastic annular part includes a through window passing through from one side of the cell toward the connection protrusions.

7. The battery module according to claim 1, wherein a resin film is formed by baking around the connection protrusion on the outer surface of the collector, and a peripheral edge of a through opening formed on the bag-shape battery case for passing through the connection protrusion, and the outer surface of the collector are adhered together by heat.

8. A cell comprising:
an electrode plate group formed by laminating a positive electrode plate and a negative electrode plate with a separator interposed between them, said electrode plate group including leads protruding toward directions opposite to each other from one side of the positive electrode plate and the negative electrode plate;
collectors joined to the leads on both sides of the electrode plate group, said collectors including a connection protrusion formed so as to protrude outside; and
a bag-shape battery case for storing the electrode plate group joined to the collectors such that only the connection protrusions of the collectors are protruded outside.

9. The cell according to claim 8, wherein a peripheral edge of a through opening formed on the bag-shape battery case for passing through the connection protrusion, and an outer surface of the collector are sealed together by an adhesive material or a seal material.

10. The cell according to claim 8, wherein a resin film is formed by baking around the connection protrusion on the outer surface of the collector, and a peripheral edge of a through opening formed on the bag-shape battery case for passing through the connection protrusion, and an outer surface of the collector are adhered together by heat.

11. The cell according to claim 8, wherein an annular elastic body with an inner peripheral edge engaged with an engaging step formed on the connection protrusion presses a peripheral edge of a through opening formed on the bag-shape battery case for passing through the connection protrusion against an outer surface of the collector.

12. A connected-cell body comprising:
a plurality of cells including an electrode plate group formed by laminating a positive electrode plate and a negative electrode plate with a separator interposed between them, said electrode plate group including leads protruding toward directions opposite to each other from one side of the positive electrode plate and the negative electrode plate, collectors joined to the leads on both sides of the electrode plate group, said collectors including a connection protrusion formed so as to protrude outside, and a bag-shape battery case for storing the electrode plate group joined to the collectors such that only the connection protrusions of the collectors are protruded outside, wherein
the neighboring cells are placed while their connection protrusions abut against each other, and the connection protrusions are welded to each other by electron beam or laser beam through a gap between cells.

13. The connected-cell body according to claim 12, wherein a pressing member is interposed between the neighboring cells for pressing a peripheral edge of a through opening formed on the bag-shape battery case for passing through the connection protrusion against an outer surface of the collector.

14. The connected-cell body according to claim 13, wherein the pressing member includes an elastic annular part surrounding the periphery of the connection protrusion, and the elastic annular part includes a through window passing through from one side of the cell toward the connection protrusions.

15. The cell according to claim 8, wherein said collectors each have first and second opposing surfaces, each of said first surfaces being joined to the leads, and said connection protrusion protruding from each of said second surfaces at a protrusion position opposing the leads.

16. The cell according to claim 15, wherein said protrusion position is disposed in a central region of the second surfaces.

17. The cell according to claim 16, wherein said battery case is of formed of a sheet material having a first sheet material surface facing said second collector surfaces, said through openings are formed in said sheet material as apertures cut therein, and peripheral regions of said first sheet material surface surrounding said apertures are sealed to said second collector surfaces.

18. The cell according to claim 17, wherein a resin film is formed around the connection protrusions on the second collector surfaces and said peripheral regions are sealed to said second collector surfaces via said resin film by heat.

19. The cell according to claim 18, further comprising:
annular elastic bodies each with an inner peripheral edge; and
said connection protrusions having engaging steps engaging said inner peripheral edges to retain said annular elastic bodies in a position pressing said peripheral regions against said second collector surfaces.

20. The cell according to claim 17, further comprising:
annular elastic bodies each with an inner peripheral edge; and
said connection protrusions having engaging steps engaging said inner peripheral edges to retain said annular elastic bodies in a position pressing said peripheral regions against said second collector surfaces.

* * * * *